(12) United States Patent
Trask

(10) Patent No.: US 12,372,151 B2
(45) Date of Patent: Jul. 29, 2025

(54) VENTED TRANSMISSION COVER

(71) Applicant: Custom Performance, L.L.C., Phoenix, AZ (US)

(72) Inventor: Nick Trask, Phoenix, AZ (US)

(73) Assignee: Custom Performance, L.L.C., Phoenix, AZ (US)

( * ) Notice: Subject to any disclaimer, the term of this patent is extended or adjusted under 35 U.S.C. 154(b) by 0 days.

(21) Appl. No.: 18/430,593

(22) Filed: Feb. 1, 2024

(65) Prior Publication Data
US 2024/0175485 A1    May 30, 2024

Related U.S. Application Data

(63) Continuation of application No. 17/862,564, filed on Jul. 12, 2022, now Pat. No. 11,920,670.

(60) Provisional application No. 63/220,852, filed on Jul. 12, 2021.

(51) Int. Cl.
| | | |
|---|---|---|
| *F16H 57/02* | (2012.01) | |
| *F01M 13/00* | (2006.01) | |
| *F16H 57/027* | (2012.01) | |
| *F16H 57/031* | (2012.01) | |

(52) U.S. Cl.
CPC ....... *F16H 57/027* (2013.01); *F01M 13/0011* (2013.01); *F16H 57/031* (2013.01); *F16H 2057/0203* (2013.01); *F16H 2057/02065* (2013.01)

(58) Field of Classification Search
CPC ............... F16H 57/027; F16H 57/031; F16H 2057/0203; F16H 2057/02065; F01M 13/0011
See application file for complete search history.

(56) References Cited

U.S. PATENT DOCUMENTS

| | | | |
|---|---|---|---|
| 11,920,670 B2* | 3/2024 | Trask | F16H 57/031 |
| 2024/0360898 A1* | 10/2024 | Kapellusch | F16H 57/027 |

* cited by examiner

*Primary Examiner* — Adam D Rogers
(74) *Attorney, Agent, or Firm* — IceMiller LLP

(57) ABSTRACT

A device configured to attach to a motor vehicle transmission housing enclosing the motor vehicle transmission is disclosed. The device includes a cover having an upper surface and a lower surface. The lower surface includes at least a first chamber and a second chamber, such that, once said cover is installed onto the motor vehicle transmission housing, the first chamber is in fluid communication with a motor vehicle crankcase and a motor vehicle oil tank, and the second chamber is in fluid communication with the motor vehicle transmission. The device includes a vent extending through the upper surface and the lower surface so as to vent pressure within said first chamber to the outside of said first chamber.

17 Claims, 13 Drawing Sheets

VENTED TRANSMISSION COVER

RELATED APPLICATION DATA

This application is a continuation of U.S. application Ser. No. 17/862,564, filed Jul. 12, 2022, which claims the priority benefit of U.S. Provisional Application Ser. No. 63/220,852, filed Jul. 12, 2021, which are hereby incorporated in their entirety by reference.

FIELD OF INVENTION

The present disclosure relates to a structural housing portion for a vehicle transmission. This disclosure specifically relates to a vented apparatus for a vehicle oil system wherein the venting occurs through a removable portion of the transmission housing commonly referred to as the transmission top cover.

BACKGROUND

Transmission covers serve several important functions, including protecting the gears and other material inside the transmission housing. Transmission covers generally prevent debris from passing into the transmission, while also allowing operators and technicians access to the transmission for inspection, maintenance, and improvements. Inside an oil system, pressure can build as a result of the reciprocation of the pistons in the crankcase. When the pistons move downward in the engine, pressure in the engine crankcase must be expelled away from the engine, which commonly diverts into the oil pan. With no way for significant amounts of the pressure to escape from the transmission housing, this pressure continues to build inside the oil system, reducing the efficiency of the engine and the transmission, while potentially creating additional and undesirable wear and tear on the transmission's and/or engine's internals, gaskets, valves, etc. There therefore exists a need for a transmission cover that reduces the accumulation and effects of pressure within the oil system and thereby allows for increased performance and reduced wear and tear. The motors of many vehicles often displace a large amount of air, creating pressure within the crankcase. This build-up of pressure can result in damage to the engine, as well as decreased performance. Attempts to address these issues have included venting at the oil dipstick; however, this solution can result in loss of oil through the vented dipstick and/or filter, particularly with hard acceleration or cornering. This loss of oil also causes oil to be displaced throughout the vehicle, where it can accumulate and cause damage. The presently disclosed embodiments are directed toward meeting this need.

SUMMARY

The presently disclosed embodiments include a device configured to attach to a motor vehicle transmission housing enclosing the motor vehicle transmission, comprising: a cover having an upper surface and a lower surface, said lower surface comprising at least a first chamber and a second chamber, such that, once said cover is installed onto said motor vehicle transmission housing, the first chamber is in fluid communication with a motor vehicle crankcase and a motor vehicle oil tank, and the second chamber is in fluid communication with said motor vehicle transmission; and a vent extending through the upper surface and the lower surface so as to vent pressure within said first chamber to the outside of said first chamber. In an aspect of such an embodiment, the device further comprises a valve governing the vent, the valve positioned such that it opens to release pressure from the motor vehicle crankcase and the motor vehicle oil tank. In an aspect of such an embodiment, the device is adapted to be sealed to a motor vehicle transmission housing. In an aspect of such an embodiment, the vent further comprises a vent tube. In an aspect of such an embodiment, the device further comprises a valve governing said vent, said valve positioned such that it opens to release pressure from the motor vehicle crankcase and the motor vehicle oil tank. In an aspect of such an embodiment, the valve is disposed within said second chamber. In an aspect of such an embodiment, the device further comprises a valve governing said vent, said valve positioned such that it opens to release pressure from the motor vehicle crankcase and the motor vehicle oil tank; and wherein said valve is engaged with said vent tube. In an aspect of such an embodiment, the valve seals said second chamber when pressure within the motor vehicle crankcase is low. In an aspect of such an embodiment, the device additionally comprises a motor vehicle transmission housing in fluid attachment with an internal combustion engine. In an aspect of such an embodiment, the lower surface comprises at least three chambers, wherein the first chamber and the second chamber are in fluid connection with the transmission, and the third chamber is in fluid connection with the crankcase. In an aspect of such an embodiment, the device further comprises a filter engaged with the vent tube. In an aspect of such an embodiment, said motor vehicle transmission housing comprises a transmission chamber adapted to contain a motor vehicle transmission and a crankcase chamber adapted to be in fluid communication with an engine crankcase, said first chamber of said cover is in fluid communication with said transmission chamber, and said second chamber of said cover is in fluid communication with said crankcase chamber.

The presently disclosed embodiments include a device configured to attach to a motor vehicle transmission housing enclosing the motor vehicle transmission comprising: a cover having an upper surface and a lower surface, said lower surface divided so as to form a crankcase vent chamber, such that, once said cover is installed onto said motor vehicle transmission housing, said crankcase vent chamber is in fluid communication with a motor vehicle crankcase; and a vent extending through the upper surface and the lower surface so as to vent pressure within said crankcase vent chamber to the outside of said crankcase vent chamber. In an aspect of such an embodiment, the device is adapted to be sealed to a motor vehicle transmission housing. In an aspect of such an embodiment, the device further comprises a valve housing having a reed valve disposed thereupon, said valve housing configured to seal said crankcase vent chamber when pressure within the motor vehicle crankcase is low. In an aspect of such an embodiment, the device further comprises a motor vehicle transmission housing in fluid attachment with an internal combustion engine. In an aspect of such an embodiment, said motor vehicle transmission housing comprises a transmission chamber adapted to contain a motor vehicle transmission and a crankcase chamber adapted to be in fluid communication with said motor vehicle crankcase, said first chamber is in fluid communication with said transmission chamber, and said second chamber is in fluid communication with said crankcase chamber.

The presently disclosed embodiments include a device configured to attach to a motor vehicle transmission housing contain the motor vehicle transmission, comprising: a cover having an upper surface and a lower surface, said lower surface comprising at least a first chamber and a second chamber, such that, once said cover is installed onto said motor vehicle transmission housing, the first chamber is in fluid communication with said motor vehicle transmission, and the second chamber is in fluid communication with a motor vehicle crankcase and a motor vehicle oil tank; and a vent extending through the upper surface and the lower surface so as to vent pressure within said second chamber to the outside of said second chamber; and a valve governing said vent and being disposed below said lower surface once said cover is installed onto said motor vehicle transmission housing, said valve comprising a reed valve configured to seal said crankcase vent chamber when pressure within the motor vehicle crankcase is low, and said valve being positioned such that it opens to release pressure from the motor vehicle crankcase and the motor vehicle oil tank. In an aspect of such an embodiment, the device additionally comprises a motor vehicle transmission housing in fluid attachment with an internal combustion engine, and wherein said motor vehicle transmission housing comprises a transmission chamber adapted to contain a motor vehicle transmission and a crankcase chamber adapted to be in fluid communication with an engine crankcase, wherein said first chamber of said cover is in fluid communication exclusively with said crankcase chamber, and said second chamber of said cover is in fluid communication with said transmission chamber. In an aspect of such an embodiment, the device further comprises a vent tube connected to the vent and a filter engaged with the vent tube. In an aspect of such an embodiment, the device includes a motor vehicle having a transmission and a motor vehicle transmission housing in accordance with one embodiment of the invention.

BRIEF DESCRIPTION OF THE DRAWINGS

The embodiments and other features, advantages, and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

Figure 1:
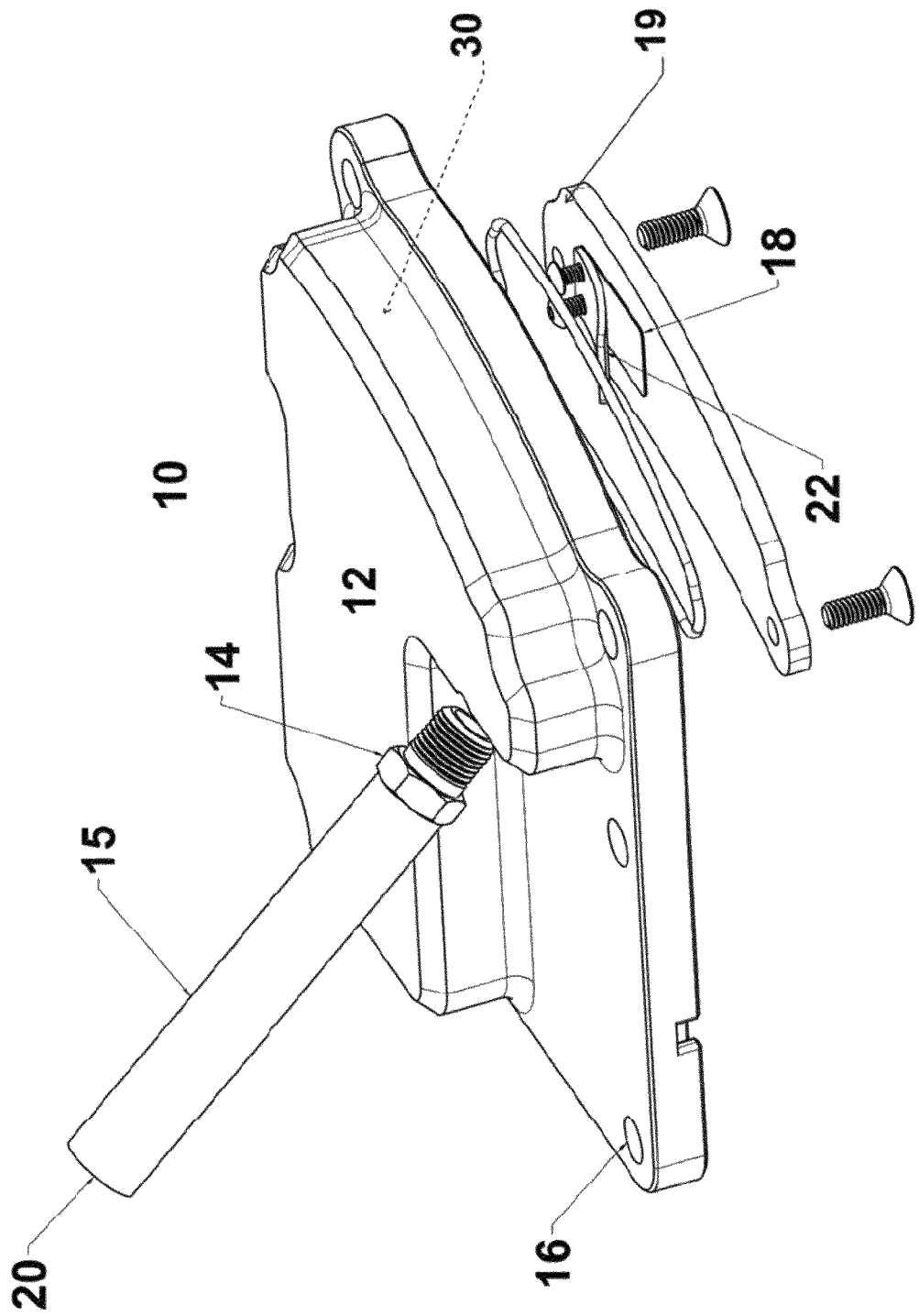
FIG. 1 is an exploded upper perspective view of a vented transmission cover according to an embodiment of the present disclosure.
Figure 2:
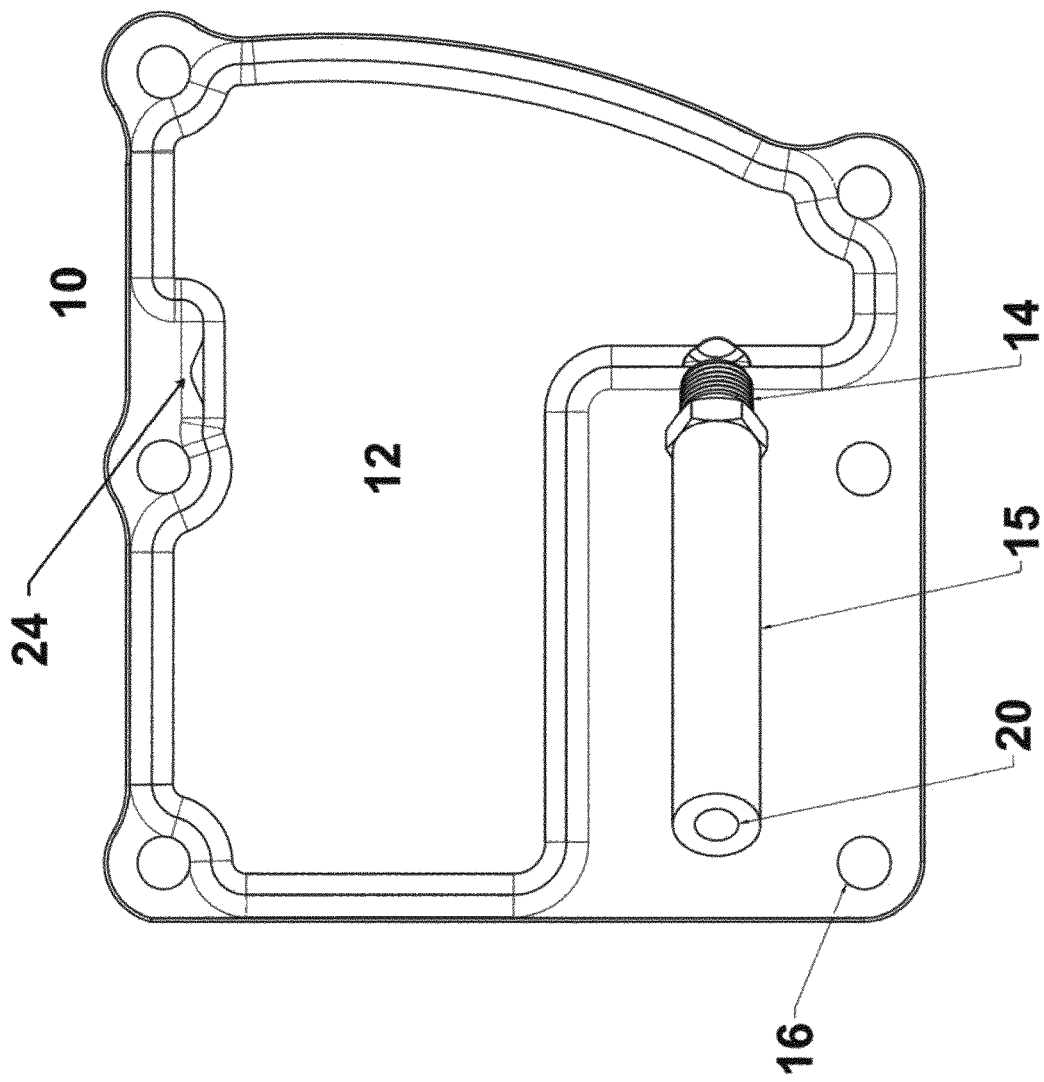
FIG. 2 is a top view of a vented transmission cover according to an embodiment of the present disclosure.
Figure 3:
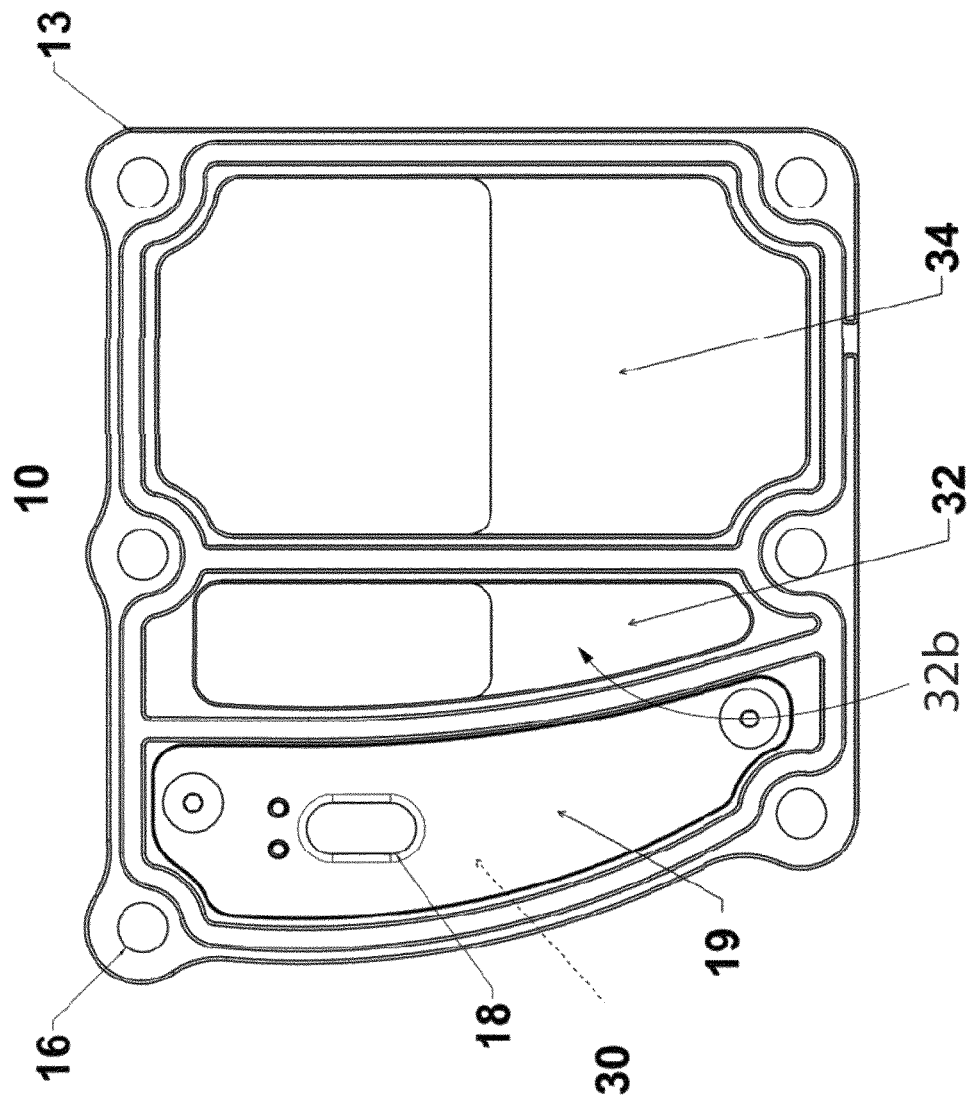
FIG. 3 is a bottom view of a vented transmission cover according to an embodiment of the present disclosure.
Figure 4:
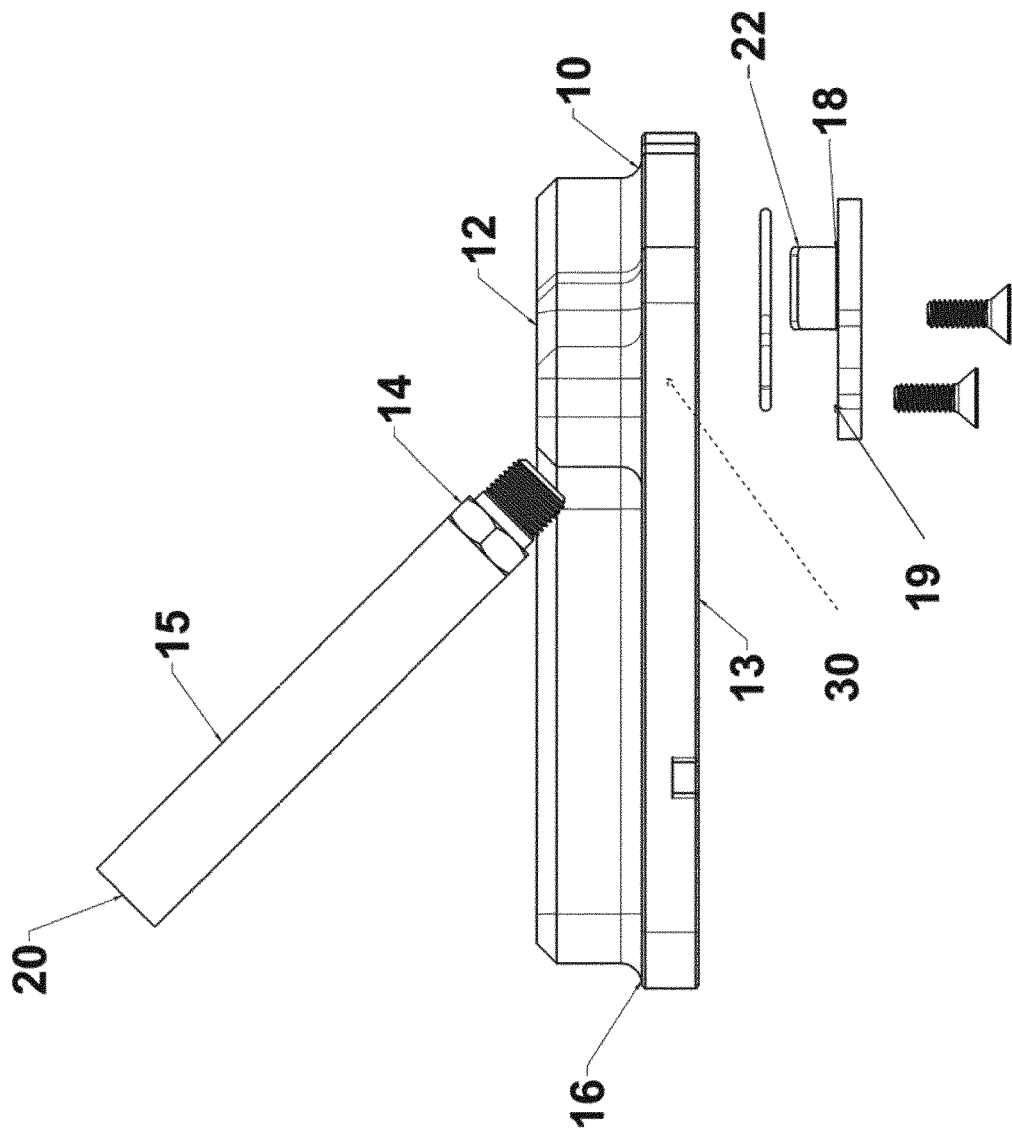
FIG. 4 is a side view of a vented transmission cover according to an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Referring now to the drawings, FIGS. 1-4 show a vented transmission cover 10 according to at least one embodiment of the present disclosure. As shown in FIGS. 1-4, the vented transmission cover 10 comprises a transmission cover upper surface 12 and a transmission cover lower surface 13. The vented transmission cover 10 also includes a vent 14. According to an embodiment, the vent 14 is configured to attach to a vent tube 15. According to an embodiment, the vent 14 extends through the transmission cover upper surface 12 and the transmission cover lower surface 13. According to an embodiment, the vented transmission cover 10 comprises transmission attachment means 16 configured to attach the vented transmission cover 10 to a transmission housing 17. According to an embodiment, the transmission attachment means 16 comprises clips for attaching the vented transmission cover 10 to the transmission housing 17. According to an embodiment, the transmission attachment means 16 comprises apertures allowing for screws, bolts, or other fasteners to attach the vented transmission cover 10 to the transmission housing 17. According to an embodiment, the transmission housing 17 includes both the transmission and the vehicle crankcase 82. According to another embodiment, the vehicle crankcase 82 is not located within the transmission housing 17.

Figure 13:
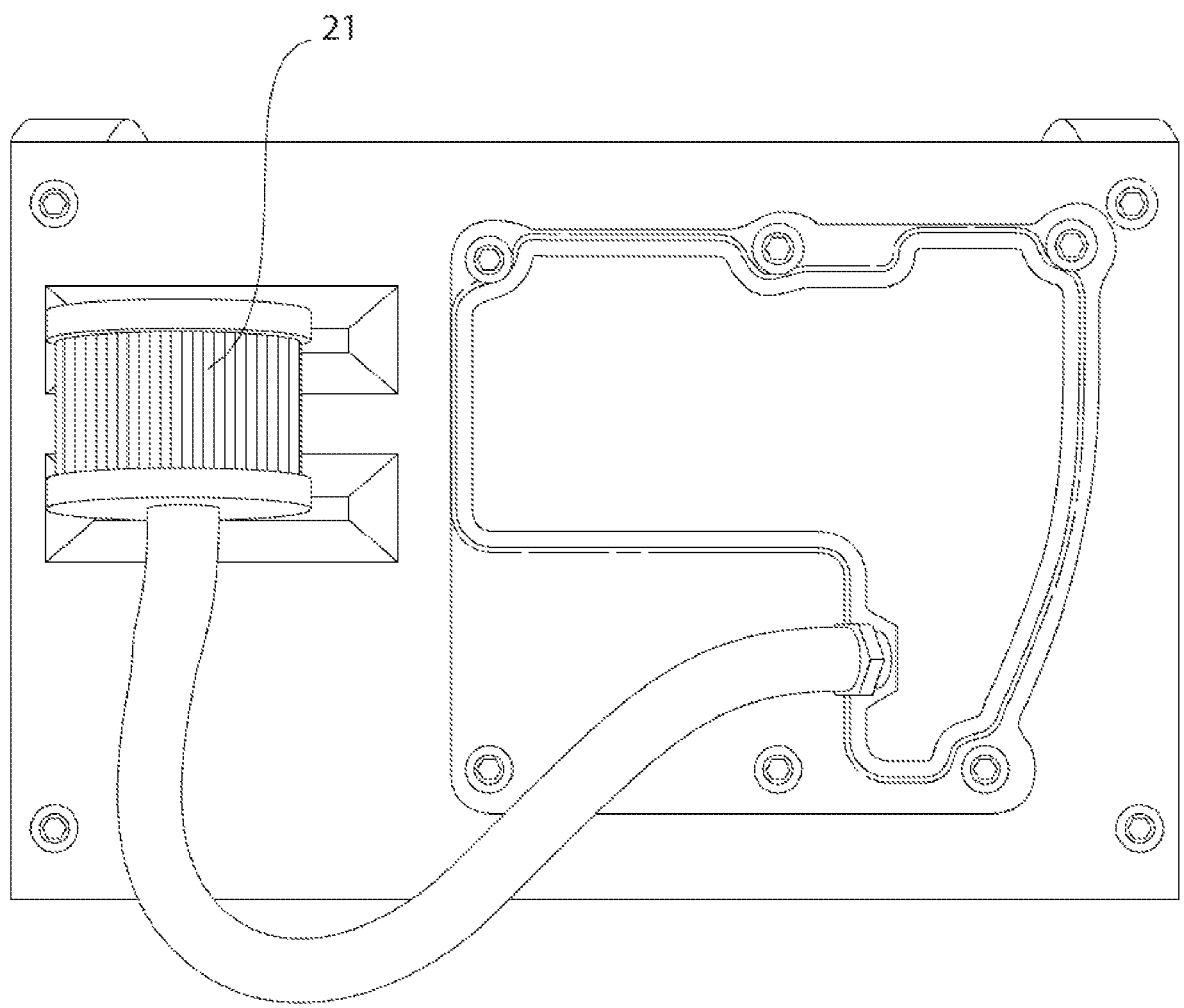
FIG. 13 is a drawing of a vented transmission cover according to an embodiment of the present disclosure.

According to an embodiment of the present disclosure, the vented transmission cover 10 includes an oil system valve 18. According to an embodiment, the oil system valve 18 is attached to the transmission cover upper surface 12. According to an embodiment, the oil system valve 18 is on any surface of the vented transmission cover 10. According to an embodiment, the oil system valve 18 is attached to the transmission cover lower surface 13. According to an embodiment the oil system valve 18 is disposed on a valve housing 19. According to an embodiment, the valve housing 19 is attached to the inner surface of the transmission cover 10. According to an embodiment, the valve housing 19 is attached to the outer surface of the transmission cover. According to an embodiment, the oil system valve 18 is located within the vent tube 15. According to an embodiment, the oil system valve 18 is in fluid connection with a filter 21 as shown in FIG. 13. According to an embodiment, the oil system valve 18 is in fluid connection with a filter 21 that is located outside of the engine and the transmission housing 17. According to an embodiment, the oil system valve 18 comprises a Boyesen one-way reed valve. According to an embodiment, the oil system valve 18 comprises a one-way valve configured to open upon the application of pressure. According to an embodiment, the vented transmission cover 10 is constructed as a single piece of material. According to an embodiment the oil system valve 18 allows for pressure to escape the transmission housing 17 along the pressure vector 20. According to an embodiment, the oil system valve 18 may include an oil system valve limiter 22 configured to restrict the amount of flex in the oil system valve 18.

According to an embodiment of the present invention, the vented transmission cover 10 includes a first chamber 30 and a second chamber 32. In such an embodiment, the first chamber 30 is in fluid connection with the crankcase 82 and is configured to vent the crankcase 82. According to an embodiment, the first chamber 30 is enclosed via the valve housing 19. According to another embodiment, the first chamber 30 is in fluid connection with the oil tank (not shown); see FIG. 14 and is configured to vent the oil tank. According to another embodiment, the first chamber 30 is in fluid connection with the oil tank and the crankcase 82 and is configured to vent the oil tank and the crankcase 82. According to such an embodiment, the second chamber 32 is configured to vent the transmission housing 17. According to an embodiment, transmission housing 17 is vented to the open air. According to an embodiment of the present invention, the vented transmission cover 10 includes a first chamber 30, a second chamber 32 and a third chamber 34. In such an embodiment the first chamber 30 vents the crankcase 82, while the second chamber 32 and the third chamber 34 vent the transmission housing 17. According to an embodiment the first chamber 30 and the second chamber 32 vent the transmission housing 17, while the third chamber 34 vents the crankcase 82. According to an embodiment of the present invention, the vented transmission cover 10 includes more than three chambers, at least one of such chambers venting the crankcase 82, and at least one of such chambers venting the transmission housing 17.

According to an embodiment of the present invention, the vented transmission cover 10 includes a transmission vent 24. According to an embodiment of the present invention, the first chamber 30 vents the crankcase 82, while the second chamber 32 vents the transmission housing 17 and the third chamber 34 houses the gears of the transmission. According to an embodiment, the transmission vent 24 includes a hose extending away from the vented transmission cover 10.

According to an embodiment of the present invention, under the vented transmission cover 10 sits a transmission housing 17. The transmission housing 17 includes a number of apertures 30a, 32a, and 34a corresponding respectively with the first chamber 30, second chamber 32 and the third chamber 34. The first aperture 30a, opening to crankcase chamber 30b, and corresponding with the first chamber 30, includes a crankcase port 35 in fluid connection with the crankcase 82 and an oil tank port 36 in fluid connection with the oil tank 37. When the vented transmission cover 10 is installed on the transmission housing 17, the fluid connection between the first chamber 30, the crankcase 82, and the oil tank allows for pressure generated at the crankcase 82 or the oil tank 37 to build within the first chamber 30. This increase in pressure pushes open the oil system valve 18, allowing pressure to escape the system, through the vent tube. The escape of pressure through the oil system valve 18, allows the oil system to maintain expected pressures, including creating or maintaining an oil vacuum to optimize performance of the motor vehicle 80. According to an embodiment of the present disclosure, the second aperture leading to transmission chamber 34b in the transmission housing 17 is a transmission venting portion which corresponds with the second chamber 32 of the vented transmission cover 10. According to an embodiment of the present disclosure, the third aperture in the transmission housing 17 covers the transmission itself, and corresponds with the third chamber 34 of the vented transmission cover 10.

According to an embodiment of the present invention, the oil system valve 18 is enclosed beneath the vented transmission cover 10 when the vented transmission cover 10 is installed According to an embodiment of the present invention, the oil system valve 18 is positioned such that when the vented transmission cover 10 is installed on a transmission housing 17 the oil system valve 18 is not enclosed within the transmission cover 10 and the transmission housing 17. According to an embodiment of the present disclosure, the oil system valve 18 is positioned within the valve housing 19, which is configured to attach to the internal surface of the vented transmission cover 10. According to an embodiment of the present disclosure, the oil system valve 18 is positioned within the valve housing 19, which is configured to attach to the outer surface of the vented transmission cover 10. According to an embodiment of the present disclosure, the oil system valve 18 is connected to the vent tube 15. According to an embodiment of the present disclosure, the oil system valve 18 comprises a portion of the vent tube 15.

Figure 5:
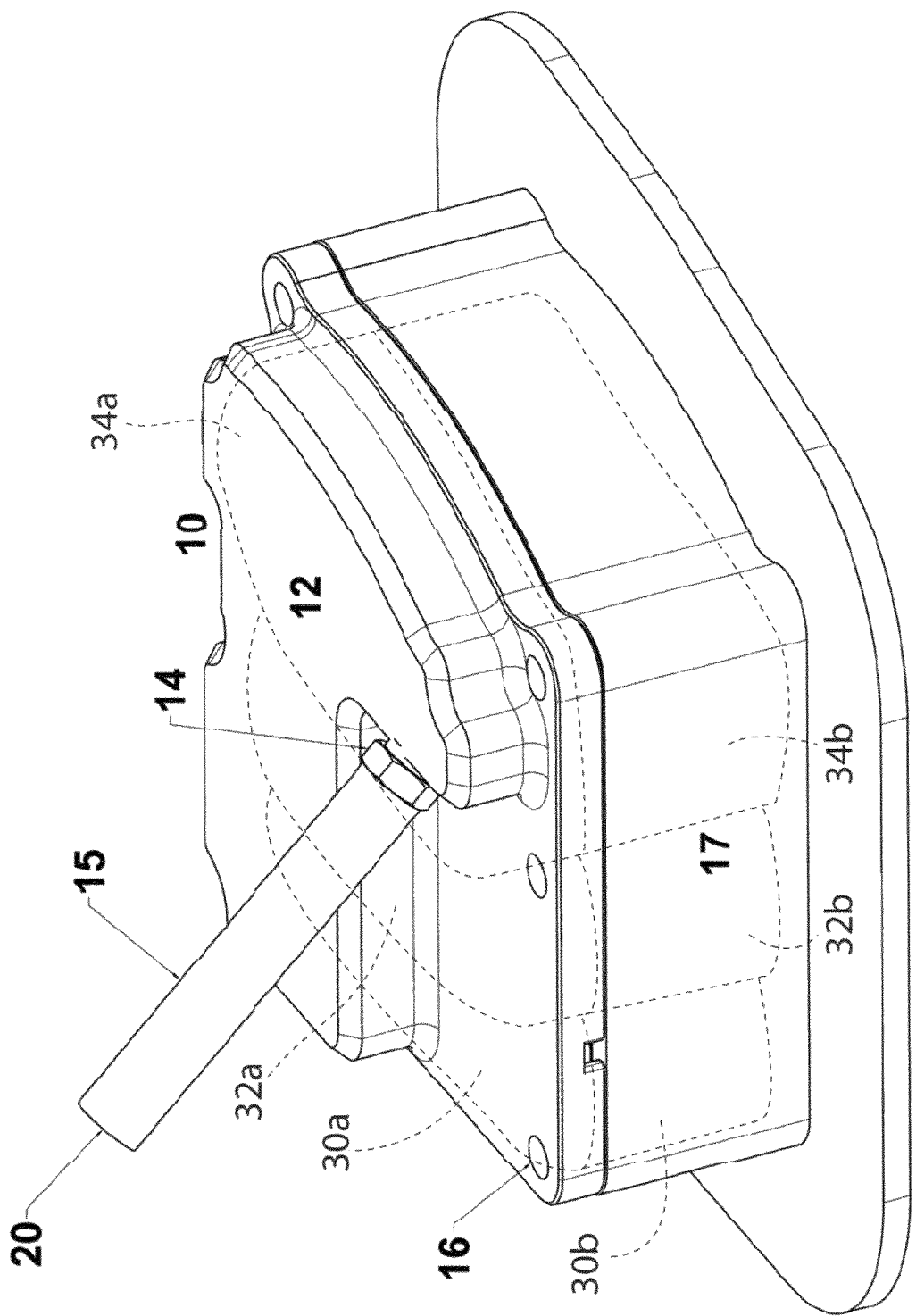
FIG. 5 is an upper perspective view of a vented transmission cover attached to a transmission according to an embodiment of the present disclosure.
Figure 6:
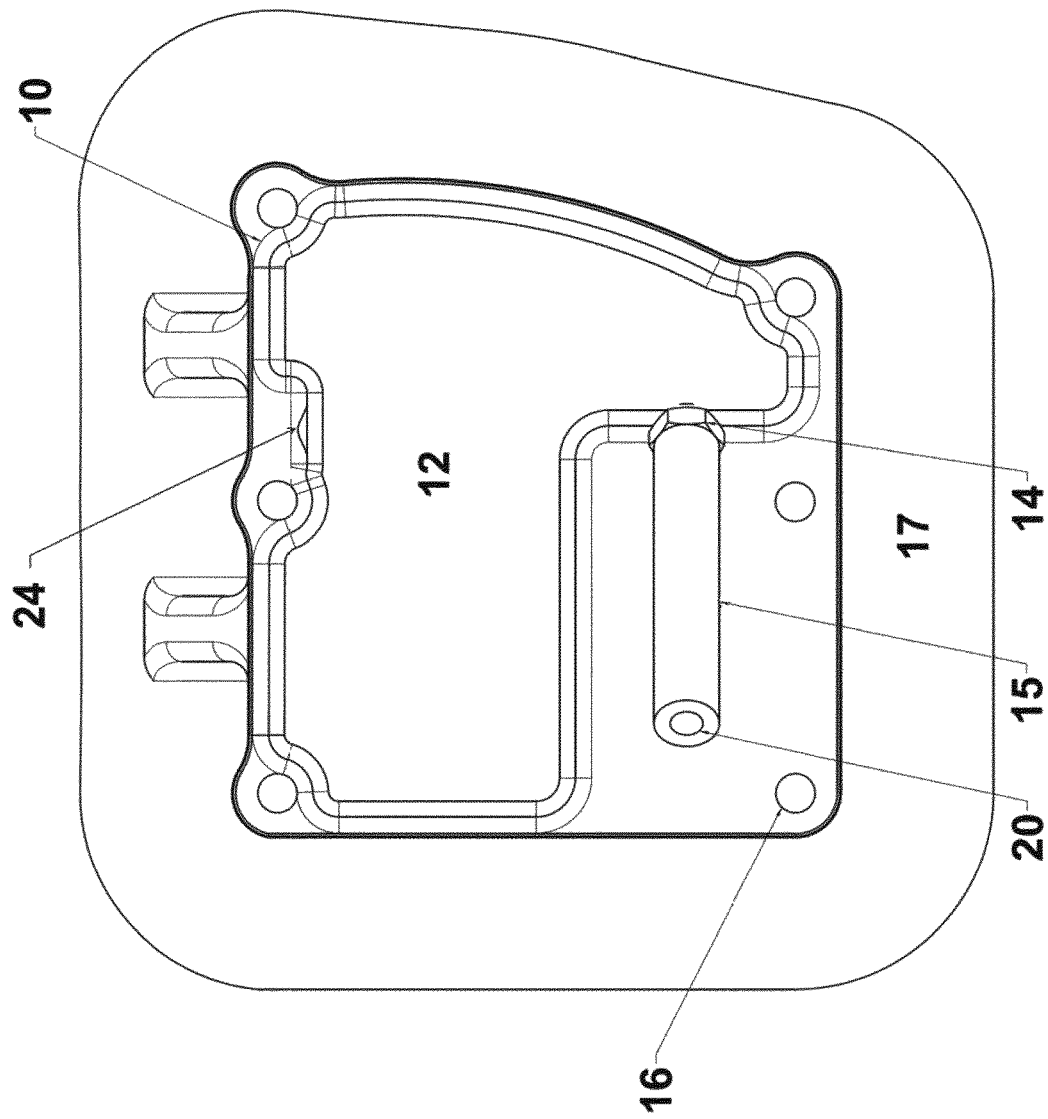
FIG. 6 is a top view of a vented transmission cover attached to a transmission according to an embodiment of the present disclosure.
Figure 7:
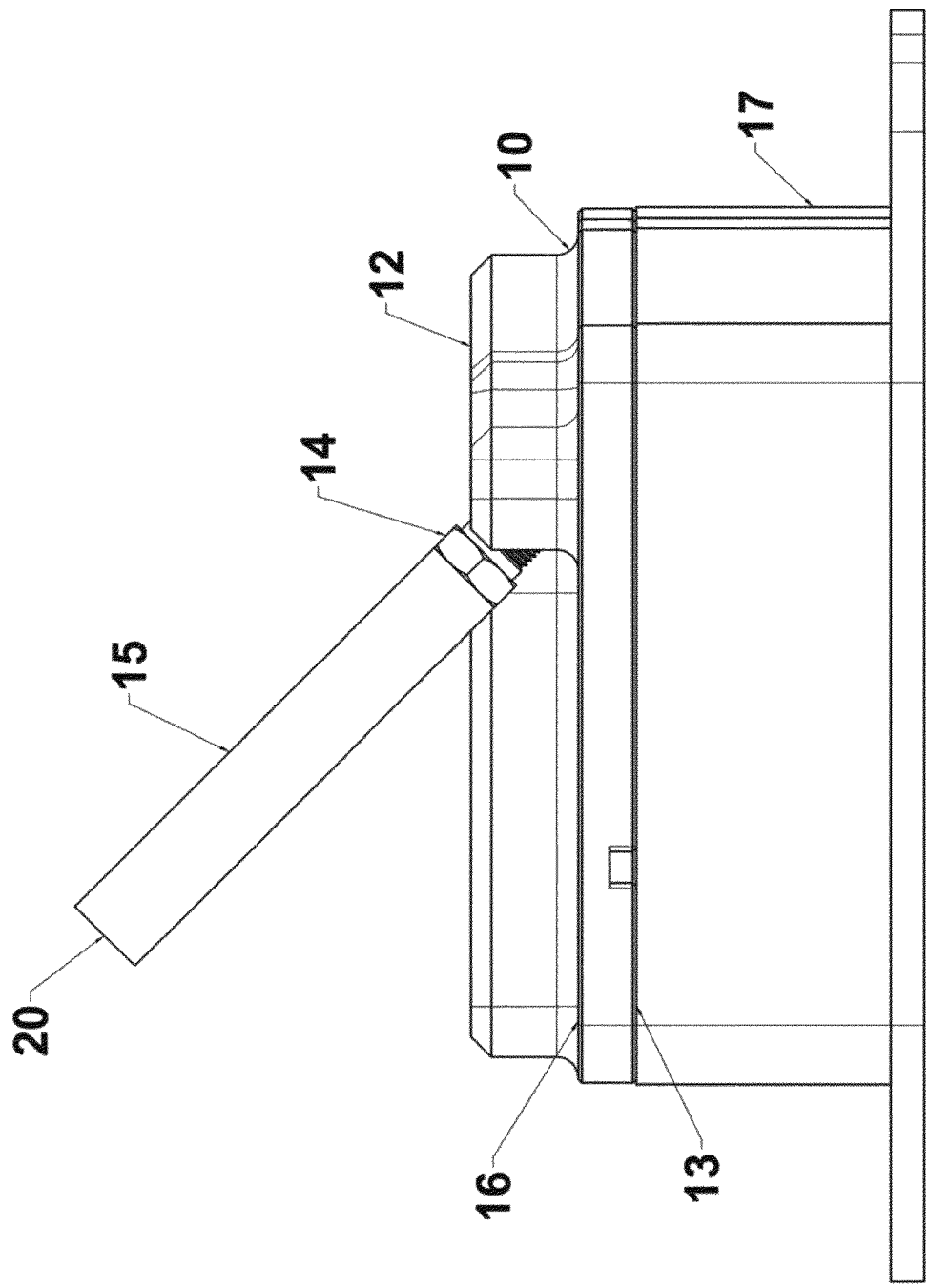
FIG. 7 is a side view of a vented transmission cover attached to a transmission according to an embodiment of the present disclosure.

FIGS. 5-7 show a vented transmission cover 10 attached to a transmission housing 17 according to an embodiment of the present disclosure. According to an embodiment, the vented transmission cover 10 is attached to the transmission housing 17 via the transmission attachment means 16.

Figure 8:
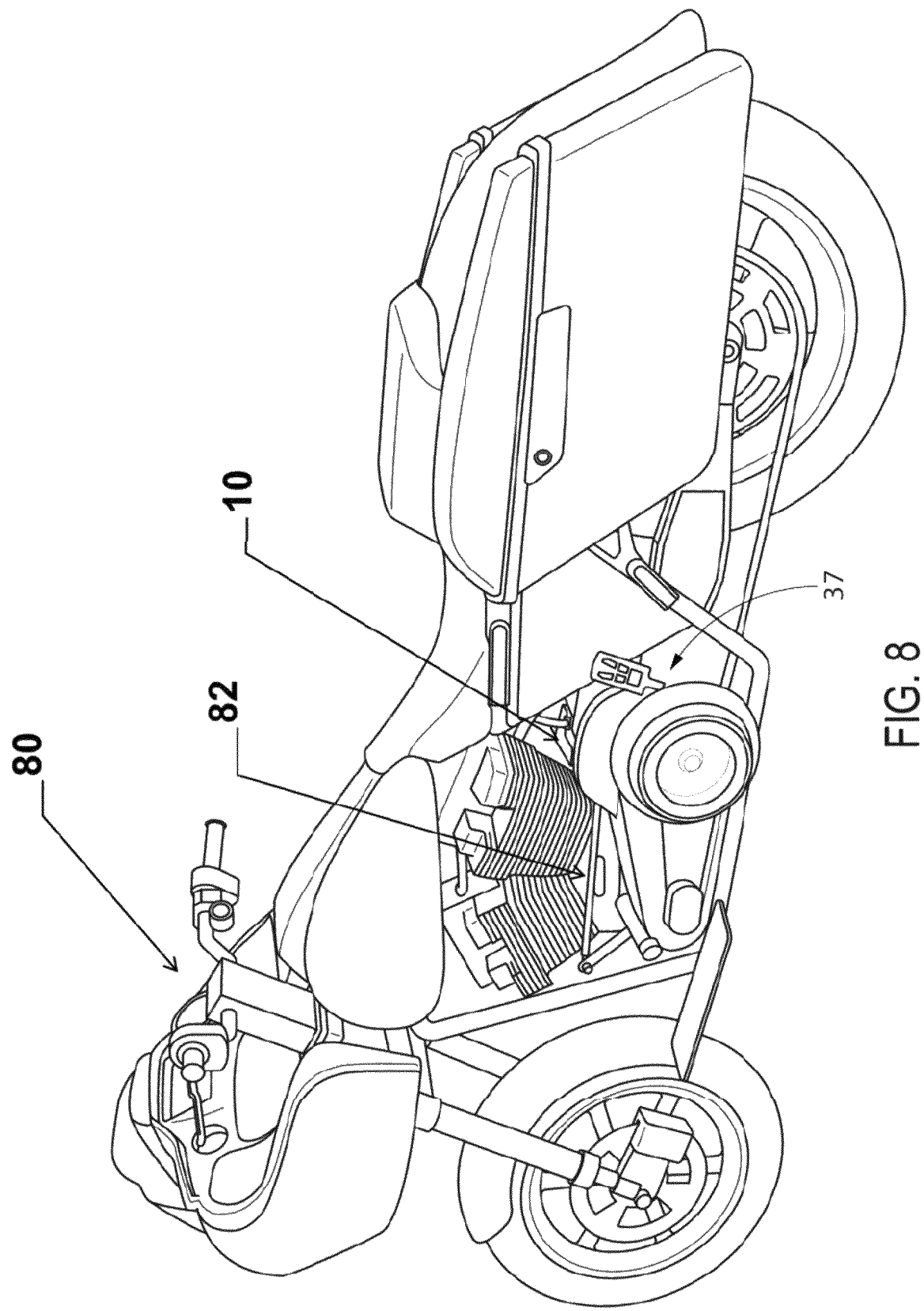
FIG. 8 is a perspective view of a vented transmission cover attached to an oil system according to an embodiment of the present disclosure.

FIG. 8 shows a vented transmission cover 10 as a part of a larger oil system engaged with a motor vehicle 80. According to an embodiment, the vehicle 80 includes a transmission housing 17 including a transmission, a crankcase 82, and a vented transmission cover 10; and also showing generally the position of oil tank 37.

Figure 9:
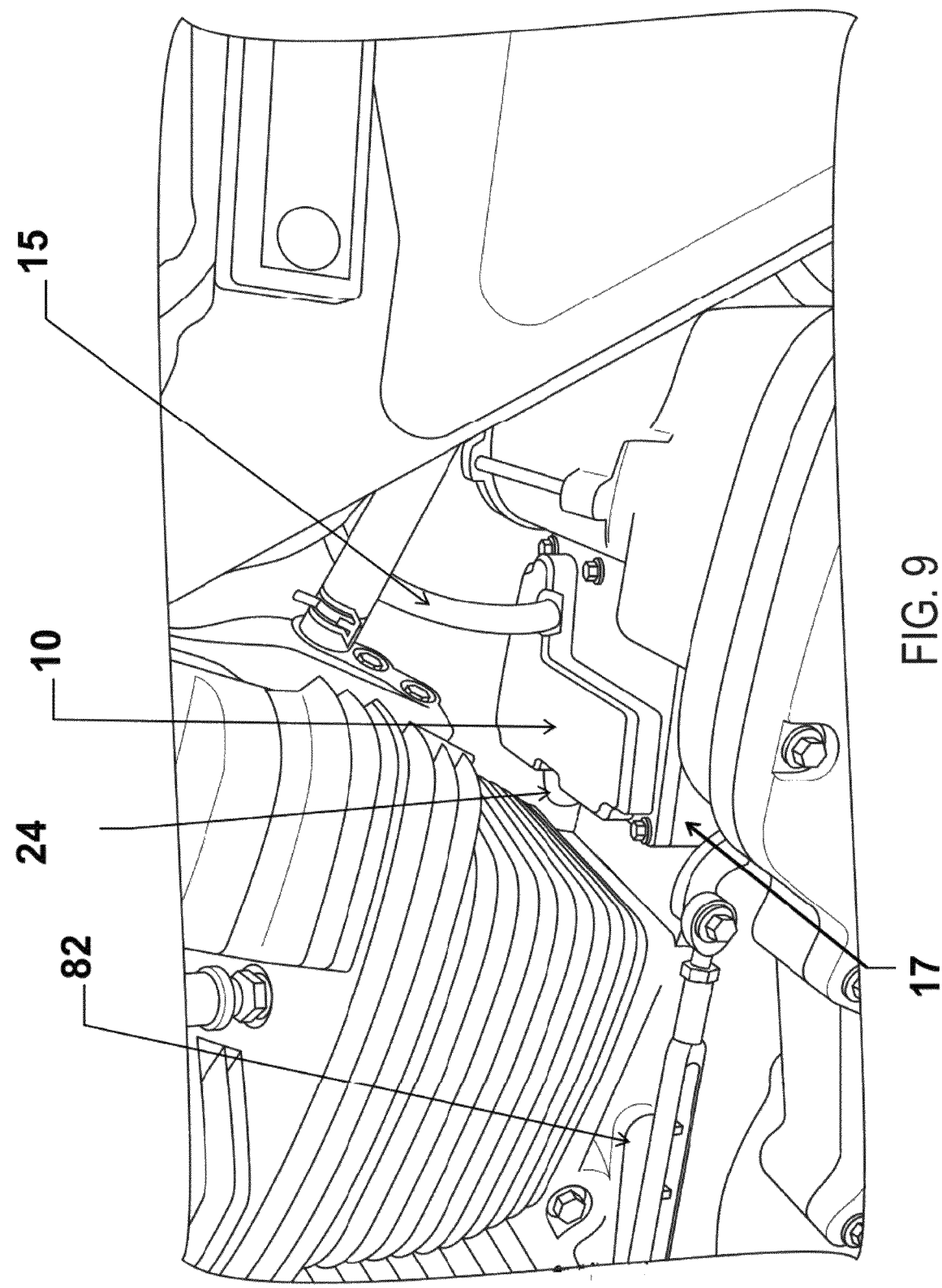
FIG. 9 is a perspective view of a vented transmission cover attached to an oil system according to an embodiment of the present disclosure.
Figure 10:
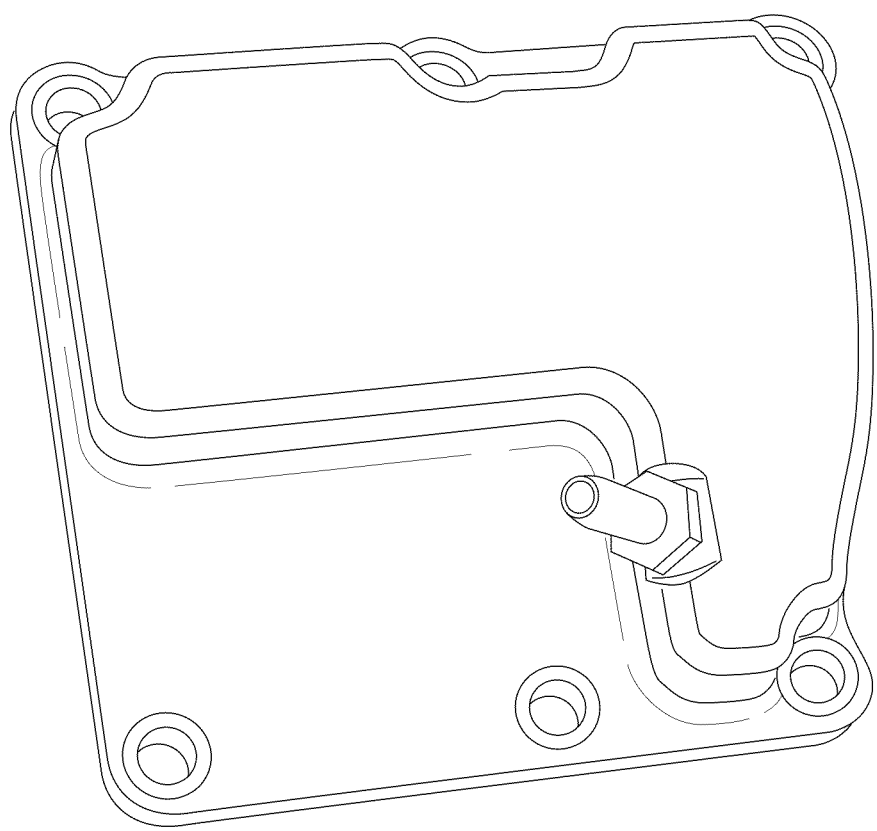
FIG. 10 is a drawing of a vented transmission cover according to an embodiment of the present disclosure.
Figure 11:
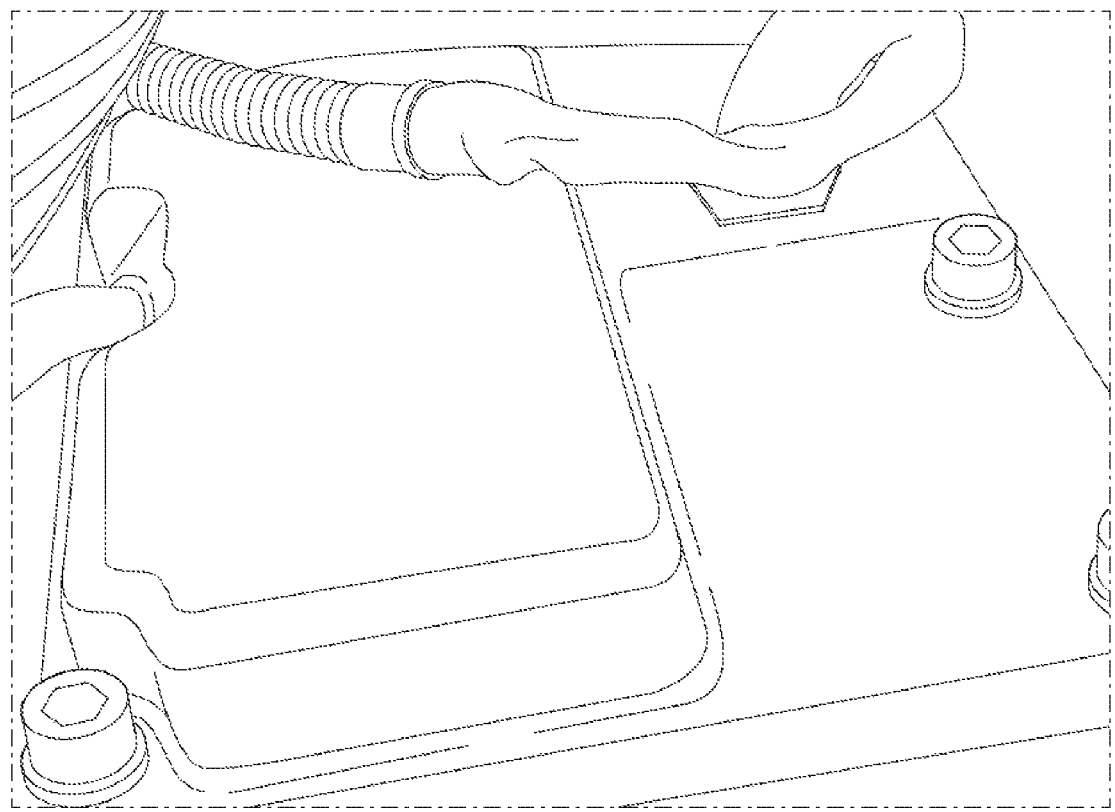
FIG. 11 is a drawing of a vented transmission cover engaged with a transmission according to an embodiment of the present disclosure.
Figure 12:
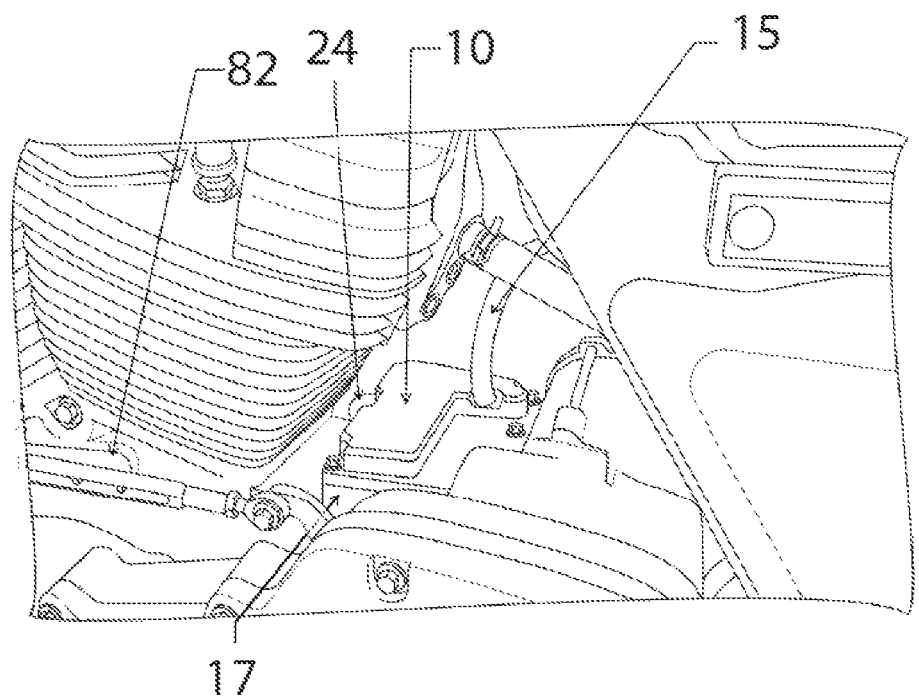
FIG. 12 is a drawing of a vented transmission cover engaged with a transmission according to an embodiment of the present disclosure.

FIG. 9 shows a close up view of a vented transmission cover 10. According to an embodiment, the vented transmission cover 10 attached to the transmission housing 17. According to an embodiment the vent tube 15 attaches to the vented transmission cover 10. In such an embodiment, pressure escapes the vented transmission cover 10 through the vent tube 15 along the pressure vector 20 as shown in FIG. 1. According to an embodiment, the vented transmission cover 10 is in fluid connection with the transmission housing 17, the crankcase 82, and the oil tank 37. According to such an embodiment, pressure generated in the crankcase 82 enters the transmission cover 10. According to such an embodiment, pressure generated in the crankcase 82 enters the first chamber 30 of the transmission cover 10. According to an embodiment, pressure is then released along the pressure vector 20 as shown in FIG. 1 through the oil system valve 18 and the vent tube 15. According to an embodiment the transmission vent tube 24 extends away from the vented transmission cover 10.

FIGS. 10-14 show various embodiments of a vented transmission 10 cover according to an embodiment of the present disclosure.

Figure 14:
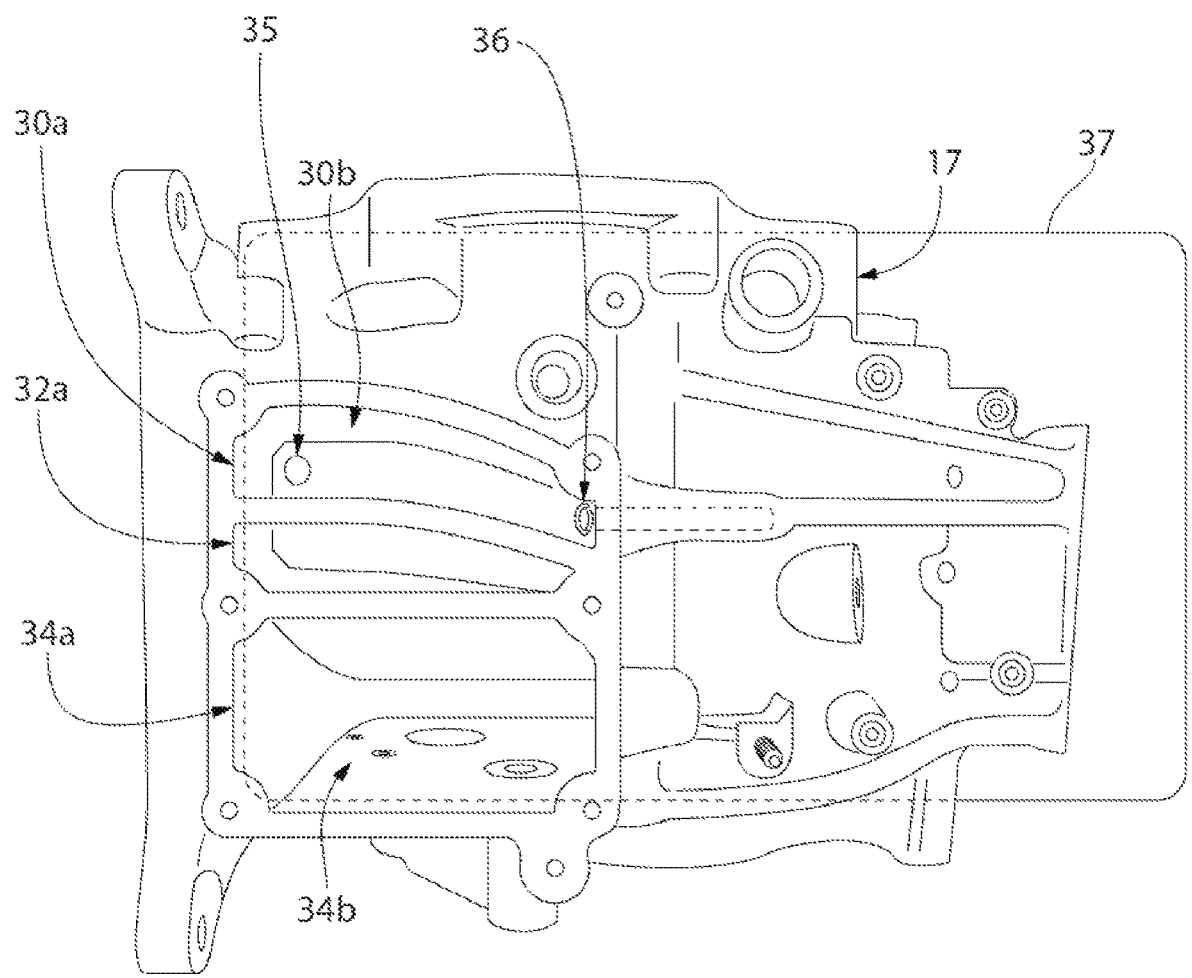
FIG. 14 is drawing of a top view of a transmission housing awaiting placement of a vented transmission cover according to an embodiment of the present disclosure.

FIG. 14 is drawing of a transmission housing 17 awaiting placement of a vented transmission cover 10 according to an embodiment of the present disclosure. FIG. 14 shows transmission housing 17 having apertures 30a, 32a and 34a that correspond to the first chamber 30, second chamber 32 and the third chamber 34 such that, when the vented transmission cover 10 is attached to the transmission housing 17, the first chamber 30, second chamber 32 and the third chamber 34 are aligned with corresponding respective apertures 30a, 32a and 34a. Once the transmission cover 10 is attached to and sealed against the transmission housing 17, first chamber 30, second chamber 32 and third chamber 34 are sealed into fluid communication with respective apertures 30a, 32a and 34a. FIG. 14 also shows the crankcase port 35 and the oil tank port 36 disposed in first chamber 30, which place first chamber 30 in fluid communication with the crankcase and oil tank 37 respectively.

According to an embodiment of the present disclosure, when pressure builds within the oil system, the oil system valve 18 opens allowing pressure to escape the oil system, passing through the oil system valve 18 and through the vent 14 and the vent tube 15 along the pressure vector 20. According to an embodiment, the pressure in the oil system is the result of the down force of the pistons (not shown), which forces gasses into the crankcase 82. According to an embodiment, once the pressure escapes the oil system, the valve 18 closes. According to an embodiment, when the oil system valve 18 is closed and the pistons (not shown) raise during the compression and exhaust strokes, the oil system valve 18 seals vent 14, cutting off the pressure vector 20, creating a pressure differential or vacuum in the oil system. The vacuum draws oil, gasses, and/or mist from the crankcase 82 facilitating normal engine function within certain RPM ranges. According to an embodiment of the present disclosure, the oil system valve 18 seals the vent 14 cutting off the pressure vector 20, until pressure within the system increases as a result of sustained increased RPM's for an extended period of time. According to an embodiment, the down force of a piston (not shown) in the crankcase 82 generates pressure. This pressure escapes the crankcase 82 along the pressure vector 20, enters the transmission cover 10, escaping via the oil system valve 18. In such an embodiment, once pressure escapes through the oil system valve 18, the oil system valve 18 closes, sealing the system. The sealing of the system allows vacuum to build within the crankcase 82 when the pistons move upward, facilitating efficient operation of the engine.

According to an embodiment of the present disclosure, the oil system valve 18 is a one-way valve. Such an oil system valve 18 opens when pressure increases within the transmission housing 17 to allow pressure to dissipate from the transmission housing 17, through the vented transmission cover 10 via the vent tube 15 along the pressure vector 20. Upon the dissipation of this pressure, the oil system valve 18 closes, allowing a vacuum to form in the transmission housing 17 or the crankcase 82 of the engine or both. According to an embodiment, the amount of increased pressure within the transmission housing 17 required to open the oil system valve 18 is one pound per square inch. According to an embodiment, the amount of increased pressure within the transmission housing 17 required to open the oil system valve 18 is between 0.5 and 2 pounds per square inch.

According to an embodiment of the present disclosure, the oil system valve 18 opens when pressure increases within the crankcase 82 to allow pressure to dissipate from the crankcase 82, through the vented transmission cover 10 via the vent tube 15 along the pressure vector 20. Upon the dissipation of this pressure, the oil system valve 18 closes, allowing a vacuum to form in the transmission housing 17 or the engine crankcase 82 or both.

One of skill in the art will appreciate that the transmission housing 17 may be in fluid contact with the crankcase 82 of the vehicle 80. According to an embodiment of the present invention, the motor vehicle 80 is a motorcycle. According to an embodiment of the present invention, the motor vehicle 80 is an all-terrain vehicle.

According to an embodiment, pressure within the system of a motor vehicle 80 is generated within the crankcase 82, and travels along a gradient. According to such an embodiment, the gradient extends from the crankcase 82 to the first chamber 30 of the vented transmission cover 10. Once pressure increases within the first chamber 30 of the vented transmission cover 10, the pressure forces the oil system valve 18 to the open position, thereby allowing pressure to escape the vented transmission cover 10 through the vent tube 15. According to an embodiment, once pressure increases within the first aperture of the transmission housing 17, the pressure forces the oil system valve 18 to the open position, thereby allowing pressure to escape the crankcase and enter the first chamber 30. According to such an embodiment, pressure then escapes the first chamber 30 through the vent tube 15.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in an implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A device configured to attach to a motor vehicle transmission housing enclosing a motor vehicle transmission, comprising:
   a. a cover comprising at least a first chamber and a second chamber, such that, once said cover is installed onto said motor vehicle transmission housing, the first chamber is in fluid communication with a motor vehicle crankcase and a motor vehicle oil tank, and the second chamber is in fluid communication with said motor vehicle transmission;
   b. a vent configured to vent pressure within said first chamber to the outside of said first chamber, and
   c. a valve governing said vent said valve positioned such that it pens to release pressure from the motor vehicle crankcase, wherein said valve seals said first chamber when pressure within the motor vehicle crankcase drops following release of pressure from the motor vehicle crankcase.

2. The device of claim 1 wherein the device is adapted to be sealed to the motor vehicle transmission housing.

3. The device of claim 1 further comprising a vent tube in fluid communication with the vent.

4. The device of claim 3 further comprising a filter engaged with the vent tube.

5. The device of claim 1 wherein the valve is disposed within said first chamber.

6. An internal combustion engine in fluid attachment with the motor vehicle transmission housing, said motor vehicle transmission housing having the device according to claim 1 attached thereto.

7. The device of claim 1 the cover comprising a third chamber, wherein the third chamber is in fluid connection the motor vehicle transmission.

8. The device according to claim 1, wherein said motor vehicle transmission housing comprises a transmission chamber adapted to contain the motor vehicle transmission and a crankcase chamber adapted to be in fluid communication with the motor vehicle crankcase, said first chamber of said cover is in fluid communication with said chamber, and said second chamber of said cover is in fluid communication with said transmission chamber.

9. The device of claim 1, wherein the valve is comprised of a one-way valve configured to open upon the application of pressure.

10. A device configured to attach to a motor vehicle transmission housing enclosing a motor vehicle transmission comprising:
   a. a cover for the motor vehicle transmission housing, said cover divided so as to form a first chamber and a second chamber, such that, once said cover is installed onto said motor vehicle transmission housing, said first chamber is in fluid communication with a motor vehicle crankcase and said second chamber is in fluid communication with the motor vehicle transmission; and
   b. a vent extending through the cover so as to vent pressure within said first chamber to the outside of said first chamber; and
   c. said motor vehicle transmission housing comprising a transmission chamber adapted to contain the motor vehicle transmission and a crankcase chamber adapted to be in fluid communication with the motor vehicle crankcase, said first chamber is in fluid communication with said crankcase chamber and said second chamber is in fluid communication with said transmission chamber.

11. The device of claim 10 wherein the device is adapted to be sealed to the motor vehicle transmission housing.

12. The device of claim 10 further comprising a valve, said valve comprised of a one-way valve configured to open upon the application of pressure, said valve configured to seal said first chamber when pressure within the motor vehicle crankcase drops following release of pressure from the motor vehicle crankcase.

13. An internal combustion engine in fluid attachment with the motor vehicle transmission housing, said motor vehicle transmission housing having the device according to claim 10 attached thereto.

14. A device configured to attach to a motor vehicle transmission housing enclosing a motor vehicle transmission, comprising:
   a. a cover for the motor vehicle transmission housing comprising at least a first chamber and a second chamber, such that, once said cover is installed onto said motor vehicle transmission housing, the first chamber is in fluid communication with a motor vehicle crankcase and a motor vehicle oil tank, and the second chamber is in fluid communication with said motor vehicle transmission housing;
   b. a vent extending through said cover so as to vent pressure within said first chamber to the outside of said first chamber; and
   c. a valve comprised of a one-way valve configured to open upon the application of pressure governing said vent and being disposed between said cover and said motor vehicle transmission housing once said cover is installed onto said motor vehicle transmission housing, said valve being configured to seal said first chamber when pressure within the motor vehicle crankcase drops following release of pressure from the motor vehicle crankcase, and said valve being positioned such that it opens to release pressure from the motor vehicle crankcase.

15. The device of claim 14 additionally comprising the motor vehicle transmission housing in fluid attachment with an internal combustion engine, and wherein said motor vehicle transmission housing comprises a transmission chamber adapted to contain said motor vehicle transmission and a crankcase vent chamber adapted to be in fluid communication with a motor vehicle crankcase, wherein said first chamber is in fluid communication exclusively with said crankcase vent chamber, and said second chamber is in fluid communication with said transmission chamber.

16. The device of claim 14 further comprising a vent tube connected to the vent and a filter engaged with the vent tube.

17. A motor vehicle having a transmission and the device in accordance with claim 16.

\* \* \* \* \*